(12) United States Patent
Bodard et al.

(10) Patent No.: US 9,422,887 B2
(45) Date of Patent: Aug. 23, 2016

(54) DEVICE FOR REDUCING THE NOISE EMITTED BY THE JET OF AN AIRCRAFT PROPULSION ENGINE

(75) Inventors: Guillaume Bodard, Verneuil l'Etang (FR); Alexandre Alfred Gaston Vuillemin, Fontainebleau (FR)

(73) Assignee: SNECMA, Paris (FR)

( * ) Notice: Subject to any disclaimer, the term of this patent is extended or adjusted under 35 U.S.C. 154(b) by 359 days.

(21) Appl. No.: 13/696,821

(22) PCT Filed: May 11, 2011

(86) PCT No.: PCT/FR2011/051060
§ 371 (c)(1),
(2), (4) Date: Nov. 8, 2012

(87) PCT Pub. No.: WO2011/141678
PCT Pub. Date: Nov. 17, 2011

(65) Prior Publication Data
US 2013/0055718 A1    Mar. 7, 2013

(30) Foreign Application Priority Data
May 12, 2010 (FR) ..................................... 10 53756

(51) Int. Cl.
*F02K 1/34* (2006.01)
*F02K 1/46* (2006.01)

(52) U.S. Cl.
CPC . *F02K 1/34* (2013.01); *F02K 1/46* (2013.01); F05D 2240/40 (2013.01); F05D 2250/11 (2013.01); F05D 2250/13 (2013.01); F05D 2260/96 (2013.01)

(58) Field of Classification Search
CPC ......... F02K 1/34; F02K 1/46; F05D 2260/96

USPC ....... 60/39.5, 231, 262–264, 770; 239/127.3, 239/265.17; 181/220, 221
See application file for complete search history.

(56) References Cited

U.S. PATENT DOCUMENTS 6,612,106 B2 * 9/2003 Balzer .............................. 60/204
7,055,329 B2 * 6/2006 Martens et al. ................. 60/770
(Continued)

FOREIGN PATENT DOCUMENTS

EP    1 580 419    9/2005
FR    2 929 334    10/2009
(Continued)

OTHER PUBLICATIONS

International Search Report Issued Jul. 26, 2011 in PCT/FR11/51060 Filed May 11, 2011.

*Primary Examiner* — Lorne Meade
(74) *Attorney, Agent, or Firm* — Oblon, McClelland, Maier & Neustadt, L.L.P

(57) ABSTRACT

A gas exhaust nozzle for aircraft propulsion includes at least a downstream part with a trailing edge of chevron type formed of chevrons distributed along the periphery of the nozzle. Each chevron extends downstream between an upstream transverse plane and a downstream transverse plane with free edges oriented in two converging downstream directions and defining the trailing edge. The chevrons generate vortices at the boundary of the jet emitted by the nozzle. The gas exhaust nozzle includes a device to inject auxiliary gas jets upstream of the free edges of the chevrons in the main jet through orifices placed upstream of the upstream plane in such a way as to discharge upstream of the upstream plane of the chevrons to generate the vortices upstream of the free edges of the chevrons.

6 Claims, 2 Drawing Sheets

(56) References Cited

U.S. PATENT DOCUMENTS

| | | | |
|---|---|---|---|
| 7,246,481 B2* | 7/2007 | Gutmark et al. | 60/204 |
| 7,305,817 B2* | 12/2007 | Blodgett et al. | 60/262 |
| 7,469,529 B2* | 12/2008 | Feuillard et al. | 60/226.1 |
| 7,926,285 B2* | 4/2011 | Tisdale et al. | 60/770 |
| 7,966,826 B2* | 6/2011 | Alkislar et al. | 60/770 |
| 8,015,819 B2* | 9/2011 | Thomas et al. | 60/770 |
| 8,132,756 B2* | 3/2012 | Huber et al. | 244/53 R |
| 8,157,050 B2* | 4/2012 | Huber et al. | 181/220 |
| 8,393,139 B2* | 3/2013 | Huber et al. | 60/264 |
| 2004/0088967 A1* | 5/2004 | Webster et al. | 60/204 |
| 2006/0053769 A1 | 3/2006 | Feuillard et al. | |
| 2008/0078159 A1 | 4/2008 | Thomas et al. | |
| 2009/0019857 A1* | 1/2009 | Tisdale et al. | 60/770 |
| 2009/0320487 A1 | 12/2009 | Alkislar et al. | |
| 2010/0065680 A1 | 3/2010 | Huber et al. | |
| 2011/0042162 A1 | 2/2011 | Huber et al. | |

FOREIGN PATENT DOCUMENTS

| | | |
|---|---|---|
| FR | 2 929 336 | 10/2009 |
| WO | 2008 100712 | 8/2008 |

* cited by examiner

DEVICE FOR REDUCING THE NOISE EMITTED BY THE JET OF AN AIRCRAFT PROPULSION ENGINE

The present invention concerns the field of aircraft propulsion and relates to a device for reducing the noise emitted by the jet of propulsion engines, notably turbojets, with which they are equipped.

DESCRIPTION OF THE PRIOR ART

Noise pollution is currently an important area of study for motor vehicle and aircraft manufacturers, who have as one of their prime objectives reducing the nuisance consisting of the noise of propulsion engines, notably turbojets.

A turbojet is generally a multiflow device with a hot central primary gas flow emitted by the part of the engine forming the gas generator and at least one cold flow concentric with the former and called the secondary flow. The gas generator consists of a gas turbine engine driving a fan by which air is simply compressed and guided in a so-called secondary channel concentric with the primary flow channel. The flows may be mixed immediately downstream of the gas generator before being ejected into the atmosphere via a single nozzle or ejected separately via concentric nozzles.

Although there are intense and numerous sources of noise, the jet noise remains predominant in the aircraft take-off phase during which the engine operates at its maximum power. This noise is generated by high turbulence and shear layers created in the flow mixing areas that have different physical properties, such as between the primary flow and the secondary flow or between the secondary flow and the surrounding atmosphere. This noise is wideband noise the intensity of which increases in particular with the speed of flow of the jet. Jet noise has been greatly reduced in modern engines by increasing the dilution ratio, for example, which is the ratio between the cold flow and the hot flow. It nevertheless remains to be reduced further.

One of the means employed at present for reducing noise is the use of devices referred to as chevrons that are installed on the nozzle of the primary flow of the engine in a separate flow engine. Although having a negative impact on engine performance on take-off and cruising, this solution is applied because of its efficacy in attenuating jet noise.

The invention has the object of producing means that improve the efficacy of the noise attenuating means formed by the chevrons without compromising engine performance.

Moreover, other means of attenuating the noise produced by a high-speed gas jet by accelerating its mixing with the surrounding medium are known. These means consist in producing auxiliary jets that are separate from the main jet and distributed along its periphery. They flow in a downstream direction inclined relative to the longitudinal axis of the main jet, possibly with a tangential component. This principle has already been described in the patent FR 1 195 859 and a variant in the case of a ventilated nozzle is described in the SNECMA patent FR 1 542 668.

The patent EP 1 580 418 describes a noise attenuating device for a nozzle of a gas turbine engine provided with chevrons on the downstream edge, comprising a manifold to which a plurality of azimuthally arranged tubes are connected. The tubes are associated with the chevrons and discharge downstream of their trailing edge. When they are fed from the manifold, air or another gas is injected directly into the vortices generated downstream of each chevron. This air enables weakening thereof to be delayed by energizing the core of the vortices. It is mentioned in §21 that a small jet of compressed air is injected into the vortices and interacts with them to improve mixing between the core of the vortex and the secondary flow, on the one hand, and the secondary flow and the ambient air, on the other hand. Thus weakening of the vortex is delayed and the cohesion of the vortex is maintained over a greater distance downstream of the trailing edge of the nozzle, which leads to a reduction of the jet noise. Devices with auxiliary injection of fluid are described also in FR 2929336, U.S. 2008/078159 and FR 2929334.

SUMMARY OF THE INVENTION

The present invention aims to improve the reduction of jet noise in a gas exhaust nozzle provided with chevrons along the periphery of its downstream edge, the expressions downstream and upstream referring to the direction of the gas jet.

Thus the invention relates to a gas exhaust nozzle, notably for aircraft propulsion, comprising at least a downstream part with a trailing edge of so-called chevron-type, formed of chevrons distributed along the periphery of the nozzle. Each chevron extends downstream between an upstream transverse plane and a downstream transverse plane with free edges oriented in two converging downstream directions and defining said trailing edge, the chevrons generating vortices at the boundary of the jet emitted by the nozzle. According to the invention, the nozzle is characterized in that it includes means for injecting auxiliary gas jets disposed upstream of said free edges of said chevrons and discharging upstream of said upstream plane of the chevrons, these means being adapted to inject auxiliary gas jets able to generate said vortices upstream of the free edges.

Accordingly, in contrast to the patent EP 1 550 418, action is taken upstream of the formation of the vortices. Air is injected upstream of the chevron in such a way as to generate vortices ahead of the ejection plane. This improves mixing in the shear layer. This solution is of two-fold benefit in that it enables improved mixing organization and reduction of low frequencies, at the same time as exploiting the advantages of auxiliary jets or microjets that generate lower penalties at high frequencies than chevrons alone.

Furthermore, in relation to the teaching of the patent EP 1 550 418, the air feed tubes that form the auxiliary jets may be housed within the thickness of the nozzle; the latter jets not extending as far as the chevrons, the overall size of the chevrons, a source of aerodynamic losses, is not increased.

The auxiliary jet injection means discharging upstream of said upstream plane of the chevrons, vortices may be generated more efficiently. More particularly, the chevrons having an axial plane of symmetry, the auxiliary jet injection means discharge on either side of said plane of symmetry.

To optimize the effect of the auxiliary jets, the latter may have one or more of the following features:

The auxiliary jets are directed in the direction of the axis of the nozzle at an angle between 10 and 50° to said axis.

The orientation of the auxiliary jets has a tangential component.

The auxiliary jets distributed along the periphery of the nozzle all have the same direction or different directions. More particularly, the auxiliary jets associated with each chevron have different directions.

The chevrons are of substantially triangular or trapezoidal shape.

The invention notably relates to a multiflow turbojet comprising at least one exhaust nozzle having at least one of the above features. This may be the primary flow nozzle, the secondary flow nozzle or both nozzles. The invention also applies to the flow mixer in the case of a mixed flow turbojet.

BRIEF DESCRIPTION OF THE FIGURES

Other features and advantages of the invention will emerge on reading the following description with reference to the appended drawings in which.

DESCRIPTION OF ONE EMBODIMENT

Figure 1:
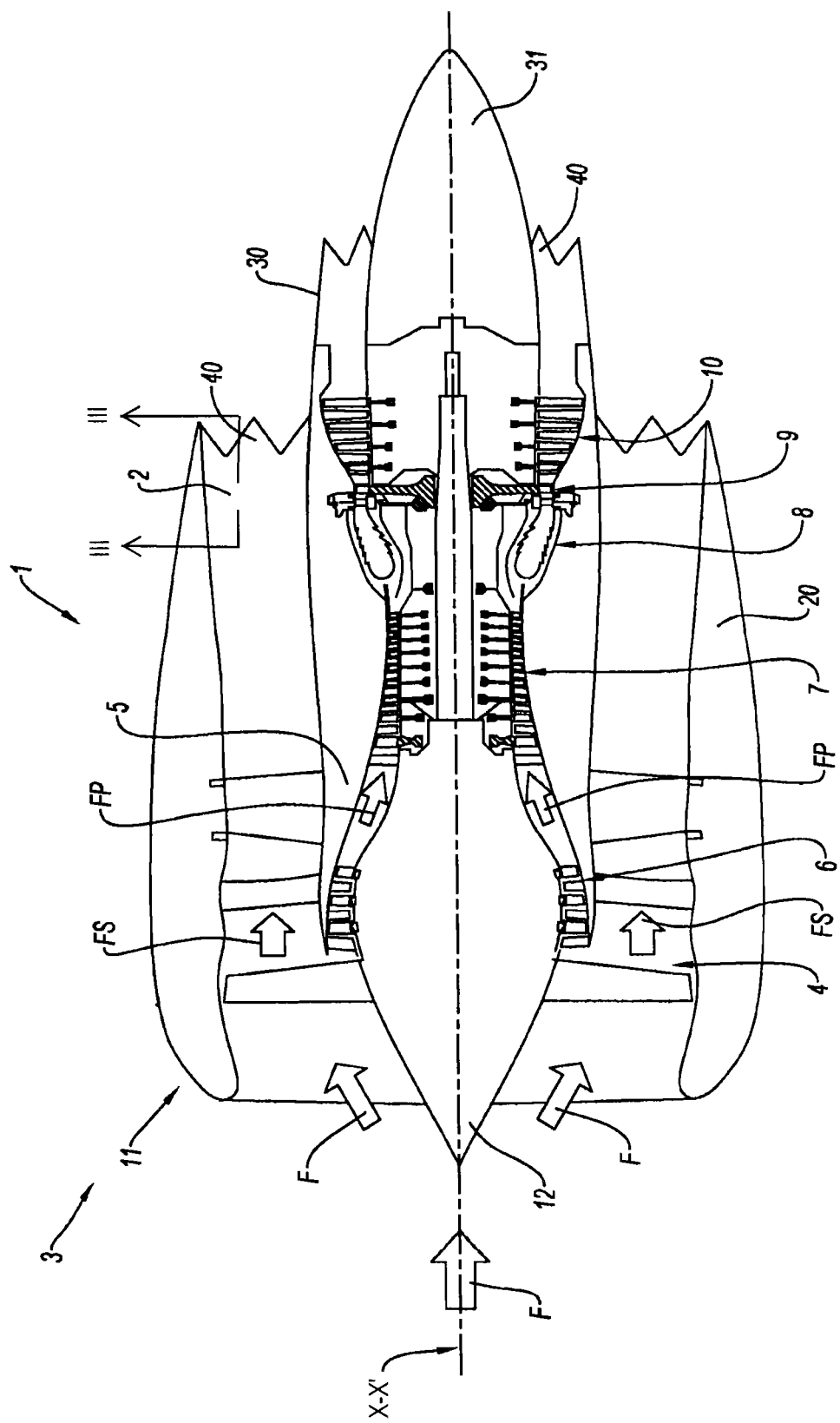
FIG. 1 represents a dual flow turbojet to which the invention applies as seen in axial section.

The turbojet 1 from FIG. 1 is of the dual flow and dual body type having symmetry of revolution about an axis X-X', with separate flow ejection. In known manner, this turbojet 1 includes, within a nacelle 2 serving as a casing for its various components, an air inlet 3 through which an incoming air flow F can penetrate, then passing through an input fan 4. This airflow F is then separated into a primary flow FP and a secondary flow FS via an intermediate casing 5 the end of which forms a separator nose.

In the remainder of the description, the terms "upstream" and "downstream" refer to axial positions along the longitudinal axis X-X' in the direction of the flow of the airflow in the turbojet 1.

The secondary flow FS passes through a synchronizing stage and is then ejected downstream of the turbojet via the cold or secondary flow nozzle 20. The primary flow FP passes successively through a low-pressure compression stage 6, a high-pressure compression stage 7, a combustion chamber 8, a high-pressure turbine stage 9 and a low-pressure turbine stage 10, finally to be ejected out of the turbojet via the primary flow nozzle 30.

The nacelle 2 of this turbojet is annular and disposed coaxially around the longitudinal axis X-X'. It enables channeling of the gas flows generated by the turbojet, defining internal and external aerodynamic gas flow lines.

The air inlet 3, the axis of which coincides with the axis X-X' of revolution of the turbomachine 1, includes an air inlet duct 11 and an air inlet cone 12. The latter enables aerodynamic guiding and distribution around the axis X-X' of the total flux F.

The primary flow nozzle 30 defines with the exhaust cone 31 an annular space through which the primary flow FP is ejected.

The secondary flow nozzle 20 defines with the fairing of the primary flow an annular space through which the secondary flow FS is ejected.

Figure 2:
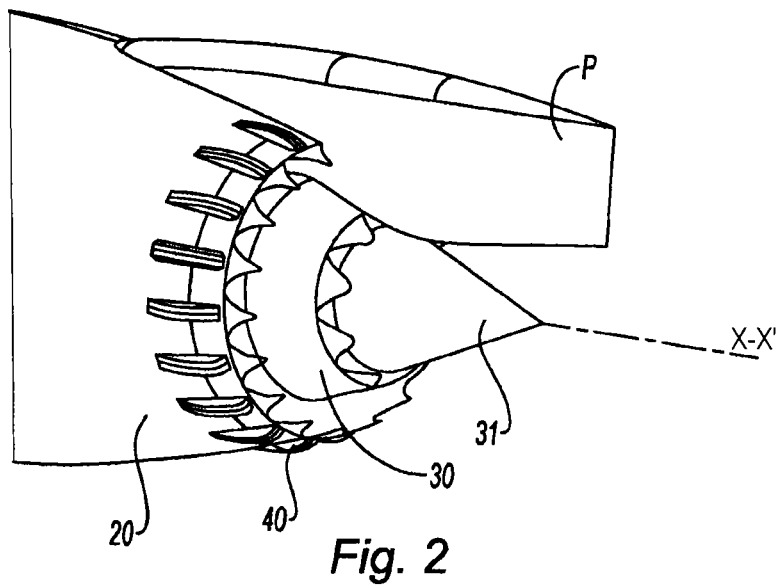
FIG. 2 represents the exhaust nozzles of an underwing-mounted turbojet including the device of the invention as seen in three-quarter rear view.

In the example shown in FIG. 2, the pylon P from which the engine is suspended crosses these annular spaces.

As is known, jet noise is reduced by disposing elements in the form of triangular or trapezoidal panels downstream of the edge of one or both nozzles, both nozzles in the FIG. 2 embodiment shown here. These elements 40, referred to as chevrons, are attached at their greatest width to the nozzle and extend between an upstream plane in line with the ejection section of the nozzle and a downstream plane; they are preferably at a non-zero angle to the axis X-X' of the engine. Here all are the same shape and the same size but they may equally be different along the periphery of the nozzles. The free edges of the chevrons are oriented in convergent directions between the upstream plane and the downstream plane. They are either straight or include curved parts. The general shape of the trailing edge is therefore a sawtooth shape along the periphery of the nozzle. This arrangement encourages the generation of vortices in the shear layer between the primary and secondary flows and between the secondary flow and the surrounding air.

In accordance with the invention, the efficacy of the chevrons is improved by generating vortices upstream of the free edges 41 and 42 of the chevrons.

Figure 3:
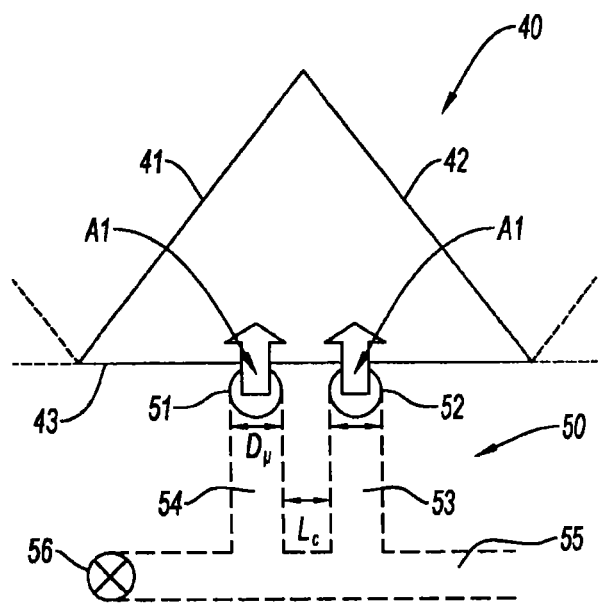
FIG. 3 shows, in detail viewed in the direction of section line III-III, a chevron with which are associated means conforming to the invention for ejection of auxiliary gases.

This result is obtained by injecting auxiliary gas jets into the main primary jet or the secondary jet upstream of the free edges 41 and 42 of the chevrons, and more particularly upstream of their upstream plane 43, via means included in a device 50 for injection of auxiliary gas jets. FIG. 3 shows a chevron 40. It is of triangular shape in this embodiment and rigidly connected to the secondary nozzle 20 via its edge situated in the upstream plane 43. The internal face of the nozzle 20, as seen from the axis X-X', is pierced by two orifices 51 and 52 into which discharge tubes 53 and 54 fed with air or combustion gas from a manifold 55. Part of the tubes running along the fairing of the secondary flow is visible in FIG. 2. The feed from the manifold 55 is controlled by a valve 56. The two orifices 51 and 52 are disposed upstream of the upstream plane 43 and, when the jet noise attenuator is operating, deliver auxiliary jets AI. In the embodiment shown the jets are oriented on the axis of the main jet, each in the direction of an edge. They are preferably inclined in the direction of the axis of the engine at an angle that may be equal to the angle of inclination of the chevron with which they are associated. They may in another embodiment have a different orientation; for example they may be divergent. Their separation ($L_c$) and their diameter ($D_u$) are parameters to be taken into account. The same applies to the thermodynamic parameters of the auxiliary jets such as the pressure, temperature and flow rate.

There are represented in FIG. 3 two orifices for the formation of two auxiliary jets for a chevron but it is also within the scope of the invention to provide a different number of auxiliary jets and an arrangement different from that shown.

When the jet noise attenuator is to be activated when the aircraft takes off, the valve 56 is operated to establish communication in particular between the manifold and a source of air at the level of the gas generator.

The auxiliary jets from the orifices 51 and 52 generate vortices which by virtue of their position are reinforced on passing over the free edges 41 and 42 of the chevron.

The contrarotating vortices created in this way downstream of the chevron are of greater energy and enable improved mixing of the flows, reducing radiation at low frequencies.

The invention claimed is:

1. A gas exhaust nozzle for aircraft propulsion, comprising:
    at least a downstream part with a trailing edge of chevron type, formed of chevrons distributed along a periphery of the nozzle, the nozzle having a longitudinal axis, each chevron extending downstream and being entirely delimited between an upstream transverse plane and a downstream transverse plane, the upstream transverse plane being perpendicular to the longitudinal axis, said trailing edge defined by a plurality of free edges and each chevron including a first free edge and a second free edge, each chevron being rigidly connected to the nozzle via a fixed edge situated in the upstream transverse plane, the first free edge and the second free edge of each chevron converging towards each other while extending from the fixed edge to the downstream transverse plane, each chevron including a first plane defining an intersection of the first free edge with the fixed edge, and a second plane defining an intersection of the second free edge with the fixed edge, the first plane and the second plane being perpendicular to the upstream transverse plane, the chevrons generating vortices at a boundary of a main jet emitted by the nozzle; and an injection device which injects auxiliary gas jets upstream of said free edges of the chevrons in the main jet through orifices separate from the chevrons, the orifices being placed adjacent to and upstream of said upstream plane in such a way as to discharge upstream of said upstream plane of th, chevrons to generate said vortices upstream of the free edges of the chevrons, wherein, for each respective chevron, one or two orifices are disposed circumferentially between the first plane and the second plane of the respective chevron.

2. The nozzle as claimed in claim 1, wherein the chevrons have an axial plane of symmetry, the orifices of the injection device being disposed in such a way as to inject the auxiliary gas jets on either side of said plane of symmetry.

3. The nozzle as claimed in claim 1, wherein the orifices of the injection device are disposed in such a way as to inject the auxiliary jets in a direction of an axis of the nozzle at an angle between 10° and 50° to said axis of the nozzle.

4. The nozzle as claimed in claim 1, wherein the chevrons are of substantially triangular or trapezoidal shape.

5. A multiflow turbojet, comprising:

at least one exhaust nozzle according to claim 1.

6. The nozzle as claimed in claim 1, wherein the nozzle is a secondary flow nozzle defining an annular space through which a secondary flow is ejected.

\* \* \* \* \*